United States Patent [19]
Shimomura

[11] 3,772,974
[45] Nov. 20, 1973

[54] SINGLE-LENS REFLEX CAMERA WITH AN AUTOMATIC APERTURE CONTROL DEVICE

[75] Inventor: Jun Shimomura, Tokyo, Japan

[73] Assignee: Nippon Kogaku K.K., Tokyo, Japan

[22] Filed: Aug. 22, 1972

[21] Appl. No.: 282,718

[30] Foreign Application Priority Data
Sept. 2, 1971 Japan.............................. 46/78861

[52] U.S. Cl................... 95/10 CD, 95/42, 95/64 D
[51] Int. Cl........ G03b 7/08, G03b 9/02, G03b 9/70
[58] Field of Search........... 95/10 C, 10 CD, 10 CE, 95/42, 64 R, 64 D, 11.5

[56] References Cited
UNITED STATES PATENTS
| | | | |
|---|---|---|---|
| 3,476,028 | 11/1969 | Yaskhiro Namba et al............ | 95/42 |
| 3,455,227 | 7/1965 | Takamoshi Sato et al. ........ | 95/64 D |
| 3,430,053 | 2/1969 | Westhaver.................... | 95/10 CD X |
| 3,611,894 | 10/1971 | Minneste, Jr................. | 95/10 CD X |
| 3,592,116 | 7/1971 | Ritze........................... | 95/10 CD X |

*Primary Examiner*—Joseph F. Peters, Jr.
*Attorney*—Joseph M. Fitzpatrick et al.

[57] ABSTRACT

A single-lens reflex camera with an automatic aperture control device comprises a photoelectric element for converting the intensity of light from an object through an objective lens into an electrical signal and disposed so that the light passed thereto through the lens may be intercepted during film exposure. Synchro contacts for flash photography are provided and adapted to close upon shutter release, and aperture control means is provided for varying the aperture opening of the objective lens. A motor for operating the aperture control means is connected with a circuit including the photoelectric element to control the aperture control means in accordance with the electrical signal. Means for stopping the motor is connected with the circuit to cut off a current to the motor upon closing of the synchro contacts, thereby stopping the motor.

3 Claims, 1 Drawing Figure

PATENTED NOV 20 1973 3,772,974
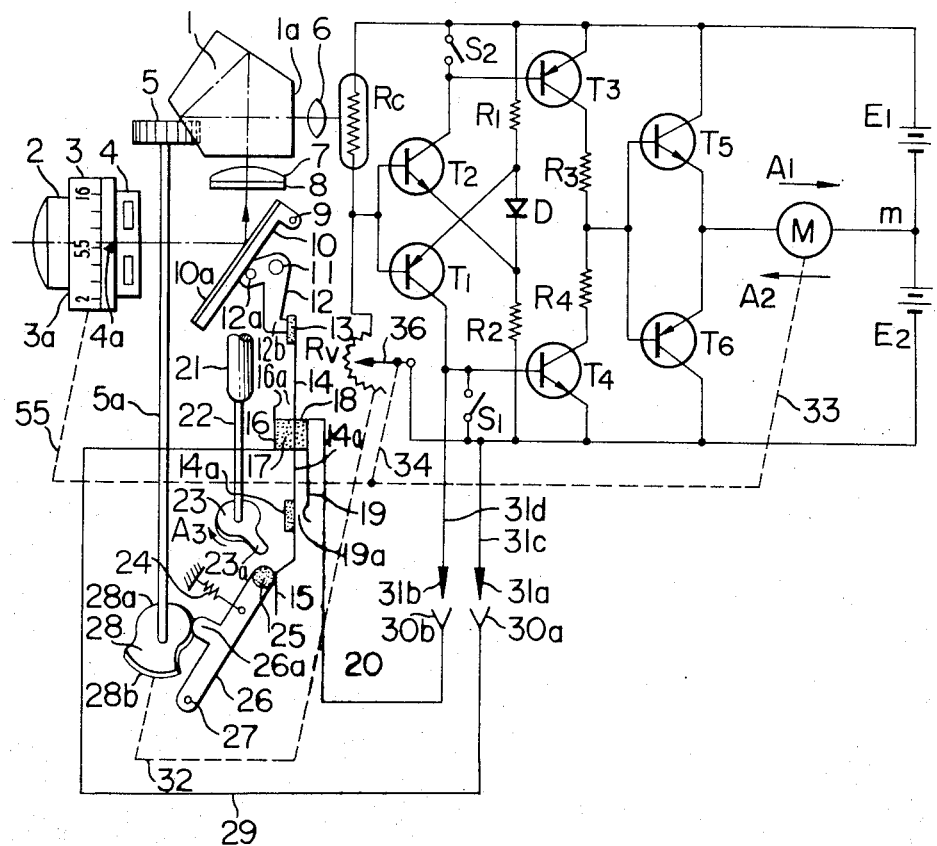

SINGLE-LENS REFLEX CAMERA WITH AN AUTOMATIC APERTURE CONTROL DEVICE

BACKGROUND OF THE INVENTION

1. Field of the Invention

This invention relates to cameras with automatic aperture control devices, and more particularly to such devices of the type in which an electrical signal of a magnitude relative to the brightness of an object to be photographed is compared with an electrical signal, the magnitude of which is determined by the setting of exposure adjusting factors such as shutter speed, film sensitivity, etc., to control the aperture opening and balance the two electrical signals. That is, the present invention is concerned with such control devices in which aperture control means is driven in a direction to close the lens aperture when the object is relatively bright, and in a direction to open the lens aperture when the object is relatively dark.

2. Description of the Prior Art

If an automatic aperture control device of the described type is applied to a TTL type single-lens reflex camera, in which light passed through a picture-taking lens is metered to determine the exposure, a problem would be encountered in that light will not reach the light receiving portion of the camera when the shutter is released. This would be caused by the shifting of a mirror where the light receiving portion is disposed, for example, in the view-finder system of the single-lens reflex camera. Also, even if the light receiving portion comprises a photoelectric element or an optical member for passing light to a photoelectric element disposed behind the mirror at least a portion of which passes light therethrough, the photoelectric element or the optical member must be retracted out of the principal optical path during photography so as not to prevent film from being exposed to light, and this again hinders the light passed through the picture-taking lens from reaching the light receiving portion.

The result would be that, upon shutter release, a signal equivalent to a relatively dark object would be supplied to the automatic aperture control device to drive the lens aperture in the opening direction, thus providing an over-exposure.

Such a phenomenon has a serious adverse effect inasmuch as a greater length of film exposure time permits the aperture to be increasingly opened during such exposure time.

As a solution to such problem, the prior art has proposed a memory device for storing the intensity of light from an object, just prior to shutter release, to be operated when the shutter button is depressed and before the reflecting mirror shifts; and also various types of circuitry therefor. Such a memory device, however, is not only considerably complicated in its electronic circuitry, but also suffers much from space limitations for incorporating it into a camera, even if it is formed into a compact integrated circuit.

SUMMARY OF THE INVENTION

The present invention proposes a solution to the above-noted problem without resorting to any memory device of the described type.

According to the present invention, a single-lens reflex camera, provided with an automatic aperture control device, comprises means for converting into an electrical signal the intensity of light passed from an object through an objective lens. These means include a photoelectric element disposed so that the light passed thereto through the objective lens may be intercepted during the exposure of the film to light. The camera further comprises synchro contacts for use during flash photography and adapted to close upon shutter release, and aperture control means for varying the size of the aperture opening of the objective lens. A motor, for operating the aperture control means, is connected with a circuit including the photoelectric element to control the aperture control means in accordance with the electrical signal from the circuit so as to provide a proper exposure. Means for stopping the motor are connected with the circuit to cut off the current to the motor upon closing of the synchro contacts, thereby to stop the motor.

The synchro contacts are closed at the latest when the shutter of the camera has been fully opened.

The electrical signal may occur in one of three magnitudes. Thus, a first signal may be produced for over-exposure, a second for proper exposure, and a third for under-exposure. The first electrical signal is used to revolve the motor in one direction, the second is used to stop the motor, and the third is used to revolve the motor in the reverse direction.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent construction as do not depart from the spirit and scope of the invention.

BRIEF DESCRIPTION OF THE DRAWING

A specific embodiment of the invention has been chosen for purposes of illustration and description, and is shown in the accompanying drawing, forming a part of the specification wherein:

The single FIGURE illustrates the principle underlying an embodiment of the present invention.

DESCRIPTION OF THE PREFERRED EMBODIMENTS

Referring to the drawing, a pentaprism 1, a condenser lens 7 disposed below the pentaprism and within the camera body, a focusing screen 8, a mirror 10a and a lens 2 together constitute a known viewfinder system for single-lens reflex camera. A condenser lens 6 is disposed behind the pentaprism 1 and opposed to the rear or exit surface 1a thereof so as to collect the light passed through the focusing screen 8 onto a photoelectric element Rc. A mirror drive lever 12 is pivotally mounted to the camera body by means of a shaft 11 and has a pin 12a studded at one end thereof, which pin is in engagement with a mirror support plate 10. The mirror 10a is integral with the support plate 10 and is supported, for pivotal movement, about a shaft 9. One end 12b of the mirror drive lever 12 is shown to be in engagement with an insulator plate 13 attached to one end of a contact 14 so that the contact 14 and a contact 16, engageable with the contact 14, are slightly spaced apart with a clearance 16a maintained therebetween. The contact 14 is held by and between insulator plates 17 and 18 fixed to the camera body and is normally biased leftwardly, as viewed, by its own resiliency so as to be moved into engagement with the contact 16 upon clockwise rotation of the mirror drive lever 12 because the end 12b thereof is then disengaged from the insulator plate 13. A drum 21 is rotatable about a shaft 22 in the direction of arrow A3 with the movement of the forward shutter blade (not shown) which opens the shutter. A cam 23 is secured to the shaft 22 and is formed with a projection 23a which, in the fully open position of the forward shutter blade, is engageable with an insulator plate 14b attached to a contact 14a integral with the aforesaid contact 14, thereby to move the contact 14a rightwardly, as viewed, into engagement with a contact 19 supported by the insulator plate 18. The contact 14a is normally biased leftwardly by its own resiliency and the end 15 thereof is stopped by a pin 25 of insulative material secured to the corresponding end of a synchro change-over lever 26, with a clearance 19a maintained between the contact 14a and the contact 19. The insulator plate 18 spaces the contacts 14, 14a apart from the contact 19. The synchro change-over lever 26 is pivotally mounted to the camera by means of a pin 27 and has a projection 26a normally biased into engagement with a change-over cam 28 by a spring 24.

The change-over cam 28 is connected to a shutter speed dial 5 by a shaft 5a and includes a larger-diametered portion 28b and a smaller-diametered portion 28a. The cam 28 is such that the portion 28b is engaged with the projection 26a of the change-over lever 26 when the shutter speed is set to a high speed such as 1/1000 sec. to 1/125 sec. and that the portion 28a is engaged with the projection 26a when the shutter speed is set to 1/60 sec. to 1 sec. The aforesaid contact 16 is connected with a synchro terminal 30a by a conductor 29, and the contact 19 is connected with a synchro terminal 30b by a conductor 20.

Description will now be made of the construction of the automatic aperture control device of the present invention.

In the illustrated embodiment, the photoelectric element Rc, such as a CdS cell, is connected in series with a variable resistor Rv. One end of the element Rc is connected with the positive terminal of an electric power source E1, and one end of the resistor Rv is connected with the negative terminal of an electric power source E2. The point of connection between the element Rc and the resistor Rv is connected with the bases of PNP transistor T1 and NPN transistor T2 which serve as bridge balance detecting transistors. A bias diode D is inserted between resistors R1 and R2, which cooperate with element Rc and resistor Rv to constitute a bridge circuit to apply a bias between the emitters of the detecting transistors T1 and T2 so as to reduce the insensitive zone of these transistors.

One end of the resistor R1 is connected with the positive terminal of the electric power source E1 and one end of the resistor R2 is connected with the negative terminal of the electric power source E2. The collectors of the transistors T1 and T2 are connected with the bases of NPN transistor T4 and PNP transistor T3, respectively. The emitter of the PNP transistor T3 is connected with the positive terminal of the electric power source E1 and the collector thereof is connected with the collector of the NPN transistor T4 through protective resistors R3 and R4. The emitter of the transistor T4 is connected with the negative terminal of the electric power source E2. An aperture control motor M is a reversible motor whose direction of rotation is determined by the "ON" and "OFF" states of NPN and PNP switching transistors T5 and T6, the bases of which are connected with the point of connection between the resistors R3 and R4 and the emitters of which are connected with one terminal of the motor M. The collector of the transistor T5 is connected with the positive terminal of the electric power source E1 and the collector of the transistor T6 is connected with the negative terminal of the electric power source E2. The other terminal of the motor M is connected with an intermediate tap m, which is connected with the negative and positive and terminals of the electric power sources E1 and E2, respectively.

The mechanical output of the aperture control motor M, such as the rotation of its shaft, is integrally associated via known mechanical interlocking means 33, 34, 35 with a preset aperture ring 3 for the picture-taking lens, and with a slide brush 36 forming, with the variable resistor Rv, an exposure factor adjusting means.

The shutter speed dial 5 is also associated via known mechanical interlocking means 32 with the exposure factor adjusting variable resistor Rv to displace this resistor itself. It will be apparent that the mechanical interlocking means 32 may be constructed so that film sensitivity may also contribute to the displacement of the resistor Rv.

The mechanical interlocking means 35 need not necessarily be associated with the preset aperture ring 3 for lens 2, but alternatively, it may be formed as the stop member for an automatic diaphragm actuating member in the normally open lens for a single-lens reflex camera. Such stop member for the automatic diaphragm actuating member need not necessarily be located within the lens, but may be associated with the camera body.

Where the lens 2 is provided with a conventional diaphragm instead of the normally open preset (automatic) diaphragm for use with a single-lens reflex camera, the mechanical interlocking means 34 may be eliminated and the photoelectric element Rc will be in the form of a so-called light-quantity feedback system whereby the aperture is automatically adjusted so as to balance the bridge. The present invention is essentially applicable to such system as well.

In the automatic aperture control circuit, terminals 31a and 31b, for insertion into the aforesaid synchro terminals 30a and 30b, are led out from the base and emitter of the transistor T4.

Further, a normally open switch S1 is provided which can short-circuit the base-emitter of the transistor T4, and a normally open switch S2 is provided which can short-circuit the base-emitter of the transistor T3. The switches S1 and S2 form the so-called limit switches and are of such mechanical construction that the switch S1 is closed when the lens assumes its open aperture and that the switch S2 is closed when the lens assumes its minimum aperture.

The operation of the present invention will be described in sequence hereunder.

In case of under-exposure (i.e., when the quantity of light incident on the photoelectric element Rc, which is designated by the resistance value of the variable resistor Rv determined by a combination of exposure adjusting factors, is greater than the actual quantity of incident light from the object to be photographed), the resistance value of the element RC is higher than that during the balance of the bridge, thus reducing the base potentials of the transistors T2 and T1. When these base potentials drop by a predetermined value below a reference potential determined by the bias voltage applied to the emitter of the transistor T1, i.e., drop below the base-emitter voltage necessary for the transistor T1 to conduct, the transistor T1 becomes conductive. The collector current of the transistor T1, in turn, renders the transistor T4 conductive. This reduces the base potentials of the transistors T6 and T5, thus rendering the transistor T6 conductive. As a result, a current in the direction of arrow A2 flows through the circuit E2 – M – T6 to start to revolve the aperture control motor M in a direction to open the lens aperture.

This is accomplished by the interlocking means 33, 35 mechanically connecting the motor M to the preset aperture ring 3. As stated previously, the interlocking means 34 is designed so as to vary the exposure factor adjusting variable resistor Rv in a direction to increase its resistance value Rv, and thus the potential at the point of connection between the photoelectric element Rc and the variable resistor Rv rises to a certain level, whereupon the base potential of the transistor T1 also rises and this transistor turns off, and accordingly the transistors T4 and T6 also turn off to deenergize the aperture control motor M, thus completing the adjustment of the aperture to a proper value.

If the object becomes brighter, the resistance value of the photoelectric element Rc is reduced to increase the potential at the point of connection between Rc and Rv, i.e., the base voltages of the transistors T1 and T2, thus breaking the balance of the bridge. Thus, the transistor T2 conducts to turn on the transistors T3 and T5 to permit a current to flow through the circuit E1 – M – T5 in the direction of arrow A1, thus revolving the aperture control motor M in the direction opposite to that previously described. In response thereto, the preset aperture ring 3 for the lens is rotated in a direction to close the lens aperture and, at the same time, the mechanical interlocking means 34 reduces the resistance of the variable resistor Rv to adjust the resistor Rv in a direction to balance the bridge again. With such adjustment, the potential at the point of connection between Rc and Rv is reduced to turn off the transistor T2 and accordingly the transistors T3 and T5, thus deenergizing the aperture control motor M to restore the balanced state of the bridge and to provide a proper exposure. The transistors T3 – T6 and resistors R3 and R4 function as control means for the motor M.

The operation of the camera's synchro mechanism will be described hereunder. Depression of the shutter button causes the mirror 10a and its support plate 10 to rotate clockwise about the shaft 9 to intercept the passage of the light passed through the picture-taking lens 2 and reflected by the mirror 10a to travel through the pentaprism 1 and condenser lens 6 to the photoelectric element Rc. As the mirror support plate 10 is rotated clockwise by the pin 12a, the lever 12 is also rotated clockwise about the shaft 11, with one end 12b thereof being moved to the left, as viewed, to permit the insulator plate 13 to be moved to the left by the resiliency of the contact 14, so that the contact 14 is brought into engagement with the contact 16. If the shutter speed dial is then set to a low speed, say, 1/60 sec. or lower, the forward blade drum 21 and the synchro travel cam 23 are rotated in the direction of arrow A3 with movement of the forward blade of the focal plane shutter travelling subsequently to movement of the mirror 10a; and when the forward diaphragm assumes its fully open position, that is, the shutter is fully opened, the projection 23a will actuate the insulator plate 14b attached to the contact 14a to the right so as to bring the contact 14a into engagement with the contact 19, whereby the synchro circuit comprising synchro terminal 30b, conductor 20, contact 19, contact 14a, contact 16, conductor 29 and terminal 30a, will be completely closed to close X contact.

If the shutter speed dial is set to a high speed, the portion 28b of the cam 28 is brought into engagement with the portion 26a of the lever 26 so that the insulating pin 25, provided at one end of this lever, actuates the one end 15 of the contact 14a to the right, thus pre-establishing an engagement between the contacts 19 and 14a. Therefore, due to the engagement between the contacts 14 and 16 resulting from the shifting of the mirror 10a, the synchro circuit is closed, thereby to close a high speed contact.

Even in this state, therefore, light will be emitted if an illuminator such as a flash lamp is connected with the synchro terminals 30a and 30b.

However, in view of the fact that such synchro-tuning circuit for the illumination as described above is not used when a picture is taken by the use of the above-described automatic aperture control device, the present invention proposes to lead conductors 31c and 31d out of the aperture control device and connect these conductors with the synchro terminals 30a and 30b by means of terminals 31a, 31b, respectively.

The result is that if a shutter button is depressed after a proper exposure has been determined by the automatic aperture control device, the mirror will be pivotally moved up to intercept the light passed to the photoelectric element, which will thus be darkened so that the aperture control motor M will start to revolve and attempt to open the aperture. Nevertheless, the synchro contacts are closed to short-circuit the base and emitter of the transistor T4 to equalize the potentials thereat, so that the transistor T4 is immediately turned off to block the attempt of the drive system to open the aperture, thus preventing the aperture from being opened any further. Thus, just prior to depression of shutter button, there is provided a proper exposure set by the automatic aperture control mechanism.

Strictly speaking, in the construction shown, the closing of the X contact takes place somewhat later than the closing of the high-speed contact and this may result in a slightly greater error than when the high-speed contact is used. As is well known, however, in the focal plane shutter, the use of the X contact is limited to relatively medium and low shutter speeds and the drive system, which attempts to open the aperture, is completely disconnected when the forward blade has been opened. Therefore, a practically sufficient accuracy of aperture control may be achieved with the photo-responsive characteristic of the entire drive system taken into account. From this, it will be clear that if the synchro mechanism in use is of the type such as a twosocket type or manual change-over type, the high-speed contacts may be connected with the terminals 31a and 31b. Also, if the synchro mechanism in use is of the type in which the closing time of the synchro contacts are variable in accordance with the type of a flash bulb used, then the terminals 31a and 31b may be connected with the synchro contacts in such a manner that they may be closed earliest after the depression of shutter button.

It will thus be appreciated that the present invention is not limited to the synchro mechanism shown, but it is also applicable to a camera with a lens shutter, in which case the aforesaid terminals 31a and 31b may be connected with M contacts adapted to close before the lens shutter blades are opened.

Thus, during photography using an automatic aperture control device, the present invention can prevent such aperture control device from being adversely affected by the quick return mirror, the light receiving element or the optical member for directing the exposure metering light to the light receiving element when they are retracted from phototaking light path in response to the shutter release button or the like, and this eliminates any possibility that the proper exposure for an object to be photographed may be hampered.

Furthermore, the present invention requires no such complex circuitry as a memory circuit, but requires only a very simple construction to achieve the purpose described above.

I believe that the construction and operation of my novel camera with automatic aperture control device will be fully understood and that its advantages will be appreciated by those persons skilled in the art.

I claim:

1. An automatic aperture control device for a single-lens reflex camera, comprising:

photoelectric conversion means (T1, T2, R1, R2, Rv, Rc) for converting into an electrical signal the intensity of light passed from an object through an objective lens, said photoelectric conversion means including a photoelectric element disposed so that the light passed thereto through said objective lens may be reduced after actuation of a shutter control, driving means (M, 33, 34, 35) for adjusting the size of diaphragm aperture of said objective lens, said driving means being connected to said aperture control means and including one motor, controlling means (T3, T4, R3, R4, T5, T6, 31d, 31c) for controlling said driving means, said controlling means including a first controlling means (T3, T4, R3, R4, T5, T6) for controlling said driving means in response to said electric signal from said photoelectric conversion means and second controlling means (31d, 31c) for stopping said driving means, and synchro contact means for flash photography adapted to be closed at the latest when the shutter of the camera is fully opened, said synchro contact means being connected to said stopping means to stop said driving means after the synchro contact means is closed.

2. An automatic aperture control device according to claim 1, wherein said photoelectric conversion means generates a first electric signal in a case of underexposure and a second electric signal in a case of overexposure; said second controlling means includes first means (T4, T6) adapted to be actuated by said first signal so that the size of the diaphragm aperture may be enlarged, and second means (T3, T5) adapted to be actuated by said second signal so that the size of the diaphragm aperture may be reduced, said first means being connected to said synchro contact means through said second controlling means so that the closure of said synchro contact means renders said first means non-operative.

3. An automatic aperture control device according to claim 2, wherein said first means include a transistor the base and emitter terminals of which are connected to said second controlling means, said transistor being conductive when said controlling means is actuated, and nonconductive when said synchro contact means is closed wherefor said driving means is stopped.

* * * * *

UNITED STATES PATENT OFFICE
CERTIFICATE OF CORRECTION

Patent No. 3,772,974    Dated November 20, 1973

Inventor(s) JUN SHIMOMURA

It is certified that error appears in the above-identified patent and that said Letters Patent are hereby corrected as shown below:

Column 5, line 7, change "RC" to -- Rc --.

Column 8, line 5, delete "said";
         line 25, change "second" to -- first --.

Signed and sealed this 2nd day of July 1974.

(SEAL)
Attest:

EDWARD M. FLETCHER, JR.       C. MARSHALL DANN
Attesting Officer              Commissioner of Patents